United States Patent Office 2,833,639
Patented May 6, 1958

2,833,639

PRE-EMERGENCE HERBICIDE CONTROL WITH DINITRO-PHENOLS

Keith C. Barrons and John D. Eastman, Midland, Mich., assignors to The Dow Chemical Company, Midland, Mich., a corporation of Delaware No Drawing. Application April 6, 1953
Serial No. 347,167

2 Claims. (Cl. 71—2.4)

The present invention relates to herbicides and is particularly directed to an improved method for the control of many undesirable weeds in large seeded crop plantings by treating the planted soil with a 2,4-dinitro-6-loweralkyl-phenol or its water-soluble salt prior to the emergence of the crop. The invention is also concerned with novel compositions containing the 2,4-dinitro-6-loweralkyl-phenols or their water-soluble salts as active toxicants, which are characterized as being equally as effective as former dinitrophenol compositions for the pre-emergence control of weeds and as having reduced phytotoxic properties for the desirable crop plants.

The 2,4-dinitro-6-loweralkyl-phenols and their water-soluble salts have been widely employed as herbicides. A recent development in the use of certain of these materials has been their application to soil surfaces previously planted with large seeded crops, for the control of germinant seeds and emerging seedlings of weeds such as pigweed, mustard, purslane, sida, cockle bur, coffee weeds, morning glory, crowfoot grass and crab grass. In such use, an aqueous dispersion of the nitrophenolic toxicant is applied to the top layer of the soil after the planting of the crop. Such applications when properly applied generally control the existing growth and materially reduce the emergence of undesirable weeds without serious injury to the crop as it later emerges. However, the differential between the dosage required to accomplish such selective control and that capable of possibly causing economic injury to the crop is relatively narrow. Because of this narrow differential and the sometimes inept application practices of agriculturalists, objectionable stunting and injury of the crop sometimes has been observed in pre-emergence control operations with the nitrophenolic toxicants. The objectionable injury is most frequently observed under extreme conditions of drought and high temperature. Thus, means for reducing the injury hazard in pre-emergence control operations with the nitrophenolic toxicants is desirable.

It is an object of the present invention to provide an improved method for controlling the existing growth of many weeds and for materially reducing the emergence of the germinat seeds of such species in large seeded crop plantings. It is a further object to provide a such method which is less injurious to the crop than existing methods. Another object is the provision of a method wherein the selectivity of nitrophenolic phytotoxicants is materially increased. Another object is the provision of a such method which substantially reduces the possibility of objectionable injury to crops under extreme conditions of drought and temperature. Another object is the provision of a wider safety factor against objectionable injury and stunting of the crop and against the ill effects of inept pre-emergence applications of the dinitrophenols and their salts. A still further object is the provision of a novel composition to be employed in the improved methods of the invention. Other objects will become apparent from the following specification and claims.

In accordance with the present invention, means has been discovered for minimizing potential injury to large seeded crops when employing 2,4-dinitro-6-loweralkyl-phenols or their water-soluble salts (1) for the control of the existing growth of many weeds and (2) for the reduction of the emergence of the germinant seeds of such undesired species in the crop plantings. Thus, the treatment with an alkali of the soil surface of an area previously planted with a large seeded crop, has been discovered materially to reduce potential injury and stunting of the crop from the described dinitrophenolics applied in aqueous dispersion to the same surface area. In general, the new method comprises applying to the soil surface of an area previously planted with a large seeded crop both (1) an aqueous dispersion of a phytotoxicant selected from the 2,4-dinitro-6-loweralkyl-phenols or their water-soluble salts and (2) an alkali. The phytotoxicant and alkali may be simultaneously applied to the soil surface, or the phytotoxicant may be applied either prior to or following the application of the alkali. In any event, the application of both agents should be completed at least 48 hours prior to the normal time for emergence of the crop plants. In the new method, the selectivity of the dinitrophenolic phytotoxicant is substantially increased. This increase is of particular significance and importance when the growing season is characterized by extreme conditions of drought and temperature, and/or when inept application practices are followed by the agriculturist or other operator. In these situations there is found a substantial reduction in crop plant injury when comparison is made to the injury obtained when following usual methods of pre-emergence control with the dinitrophenolic phytotoxicants. Further, this reduction in crop injury is obtained together with the full degree of weed control normally obtained with the dinitrophenolic phytotoxicants.

The exact dosage of the dinitrophenolic phytotoxicant applied per acre of planted soil is dependent upon the crop plant and whether overall or row treatment is to be made. On cotton, this dosage is somewhat dependent upon the soil type. With overall treatments on cotton planted in sandy loam soil, good results are obtained when the 2,4-dinitro-6-loweralkyl-phenols or their water-soluble salts are applied in the amount of from about 6 to 9 pounds per acre. The latter and all other dosages of dinitrophenolic phytotoxicant described in the present application, are expressed as pounds of 2,4-dinitro-6-loweralkyl-phenol (phenol equivalent) in the dinitrophenolic composition to be applied to one acre of soil surface. On cotton planted in clay loam or silt loam, the dinitrophenolic phytotoxicant is employed in the amount of from about 9 to 12 pounds per acre, while on clay it may be employed at a dosage of from 12 to 18 pounds per acre. On beans, corn, peas and gladiolus good results are obtained at a dosage per acre of from about 6 to 18 pounds. On potatoes, the phytotoxicant is generally applied in an overall treatment at a dosage per acre of from about 1 to 8 pounds. In row treatment, the dosage per acre of dinitrophenolic phytotoxicant is reduced by a factor equal to the ratio of width of the treated bands to the distance between rows. The term "loweralkyl" as above employed in 2,4-dinitro-6-loweralkyl-phenol refers to methyl, ethyl, propyl, butyl and amyl.

When operating in accordance with the present invention, the dinitrophenolic phytotoxicant is employed in the form of an aqueous spray mixture. Such aqueous compositions are readily prepared from the water-soluble salts of the dinitrophenols and may contain one or more of various additaments including spreading, wetting, solubilizing and dispersing agents. Dispersions containing the relatively insoluble 2,4-nitro-6-loweralkyl-phenols may be prepared by dispersing the toxicant in water with the aid of a dispersing and wetting agent. Conveniently, the dinitrophenol may be dissolved in a water-immiscible organic solvent, and this solution emulsified in water. In an alternative method, the aqueous dispersions for use herein may be formulated from previously prepared concentrate compositions containing from 10 to 95 percent by weight of the dinitrophenol or its salt in association with water, water-immiscible organic liquids, and wetting, dispersing, emulsifying or solubilizing agents. The required amount of dinitrophenolic phytotoxicant per acre may be supplied in from 10 to 150 or more gallons of aqueous spray. However in practice, it is generally found convenient to employ from about 10 to 40 gallons of dilute aqueous dispersion per acre.

The aqueous dinitrophenolic compositions, and the alkali to be employed are applied to the soil surface with conventional spraying or dusting equipment. In practice, the treatment may consist of an overall application or be confined to a band (suitably 12 to 16 inches wide) overlaying the seeded row. In a convenient and economical method of operation, the application equipment is mounted on the rear of the crop planting machine and the planting and soil treatment are co-ordinated in one operation.

The application to the soil surface of a minimum effective amount of the alkali is essential for the successful practice of the present invention. In general, good results are obtained when the alkali is applied substantially uniformly to the soil surface at a dosage per acre at least equal to that of the dinitrophenolic phytotoxicant. While amounts of alkali up to 50 pounds per acre may be applied to the soil surface, in practice, it is generally preferred to apply a dosage per acre of from about 1.5 to 2 times the weight of 2,4-dinitro-6-loweralkyl-phenol in the dinitrophenolic composition applied to one acre of planted soil.

The method of the present invention may be carried out by applying the unmodified alkali to the soil surface. However, the present invention also embraces the employment of an aqueous or dust composition containing the alkali. In such use, the alkali may be dispersed in water or in and on a finely divided solid material such as talc, chalk, attapulgite or fuller's earth. If desired, a dispersing, wetting or solubilizing agent may be employed in such aqueous compositions. These liquid and dust compositions are particularly adapted to facilitate the uniform distribution of the alkali upon the soil surface at the desired dosage. The required amount of alkali to be applied to the soil surface may conveniently be supplied per acre in from about 12 to 150 gallons or more of water or up to 100 or more pounds of finely divided carrier. The concentration of alkali to be employed in the aqueous or dust composition for the treatment of soil is not critical, and may run from about 0.2 to 40 percent by weight in aqueous compositions and from about 1 to 50 percent by weight in dusts.

If desired, the alkali may be applied to the soil on one day and the dinitrophenolic composition several days later or vice versa. When the alkali is applied as a dust, it is generally preferred that the application be made prior to the application of the aqueous dinitrophenolic composition. In any event, it is desirable that both the dinitrophenolic and alkali be applied to the soil not later than 48 hours prior to the emergence of the crop, as the crop may be injured if the application is made during the emerging period. On cotton, the preferred time of application is during the first 24 hours after planting. For best results on potatoes, it is preferred that the time of application be delayed until about 10 days after planting.

A further embodiment of the invention includes a single application to the planted soil surface of a composition comprising the nitrophenolic phytotoxicant and an excess of an alkali such as sodium carbonate or an alkyl or alkanolamine. Such compositions may be prepared by dispersing the alkali in the dilute aqueous dispersion of the dinitrophenolic composition. In an alternative method, the alkali may be dispersed in the water to be employed in making the dinitrophenolic dispersion. In another method, single treatment compositions comprising the dinitrophenolic phytotoxicant and an excess of alkaolamine conveniently may be prepared from concentrate compositions containing from 10 to 90 percent by weight of a mixture of free alkanolamine and dinitrophenolic toxicant in association with one or more of a group of materials such as water, water-immiscible organic liquids, and wetting, dispersing, emulsifying and solubilizing agents. In either the concentrate compositions or the ultimate aqueous dilutions, the alkali should be present in large molecular excess over the dinitrophenolic, e. g. at least 1 pound of alkali for each pound of 2,4-dinitro-6-loweralkyl-phenol (phenol equivalent) in the compositions. The latter compositions and the single treatment method wherein said compositions are employed, constitute preferred embodiments of the present invention.

The following examples are illustrative:

Example 1

A commercially available, pre-emergence herbicide composition having the following parts by weight of ingredients will hereinafter be known as "Concentrate A."

| | |
|---|---|
| Alkanolamine salts (of the ethanol and isopropanolamine series) of 2,4-dinitro-6-secondary-butyl-phenol | 53 |
| Commercial dispersing and solubilizing agents | 12 |
| Isopropanol | 14 |
| Water | 21 |

Concentrate A and calcium hydroxide, $Ca(OH)_2$, were separately dispersed in water to prepare two dilute aqueous spray compositions, one containing 9 pounds of 2,4-dinitro-6-secondarybutyl-phenol (phenol equivalent) per 40 gallons and the other 6 pounds of calcium hydroxide per 40 gallons of spray mixture. The spray compositions were separately applied to the surface of dry sandy loam soil of good nutrient content at a dosage per acre of 40 gallons of the dinitrophenolic composition and 120 gallons of the calcium hydroxide composition. The applications were carried out with a traveling boom type spray rig at a pressure of about 40 pounds per square inch, the calcium hydroxide spray being applied to the soil surface immediately prior to the application of the dinitrophenolic spray composition. Just prior to the treatments, the soil had been prepared and seeded to cotton. In a control operation, similarly prepared and seeded soil was treated solely with the dilute aqueous dinitrophenolic composition in the above described manner and at a dosage of 40 gallons per acre. The soil plots from before planting and through the pre- and post-emergent period, were under conditions of prolonged drought with prevailing temperatures of from 80° to 90° C.

Seven days after the treatments, the treated and untreated areas were sampled with cotton plants being lifted from the soil, their roots cleaned and the plants thereafter carefully examined for evidence of injury attributable to the dinotrophenolic phytotoxicant. From the examination it was found that 90 precent of the plants from the soil plots which had been treated with both calcium hydroxide and nitrophenolic phytotoxicant, showed no significant injury attributable to the treatment. In contrast, 70 percent of the plants from the soil plots which had been treated solely with the dinitrophenolic spray compositions were found to exhibit severe injury attributable to the phytotoxicant. The stems of the latter plants were indented with hypoplastic necrotic lesions which were seriously retarding normal growth processes.

Example 2

A further operation was carried out in a manner exactly comparable to that described in Example 1, except that the calcium hydroxide was applied to the soil surface as a dust and at a dosage of about 50 pounds per acre. Upon examination seven days after the applications, there was found no significant stunting or injury to the cotton plants from the soil plots which had been treated with both the dinitrophenolic composition and the calcium hydroxide dust. In contrast, 70 percent of the cotton plants from the soil plots which had been treated solely with the dinitrophenolic composition exhibited definite injury. The stems of the latter plants were scarred with hypoplastic necrotic lesions which were seriously reducing normal growth processes.

Example 3

Concentrate A and calcium hydroxide were separately dispersed in water to prepare two aqueous spray compositions, one containing 18 pounds of 2,4-dinitro-6-secondarybutyl-phenol (phenol equivalent) per 40 gallons and the other 8.3 pounds of calcium hydroxide per 40 gallons of spray mixture. These compositions were employed in the manner described in Example 1 for the treatment of soil seeded with cotton. The application techniques, dosages and conditions for growth were as previously described except that the dinitrophenolic composition was applied to the soil surface immediately prior to the application of the calcium hydroxide composition.

Fourteen days following the application, the fields were sampled and representative cotton plants lifted from the soil, their roots cleaned and the plants thereafter examined for evidence of injury attributable to the dinitrophenolic phytotoxicant. From the examination it was found that the plants from the soil plots which had been treated with both the nitrophenolic toxicant and calcium hydroxide were entirely free of objectionable stunting and injury. In contrast, 77 percent of the plants from the check plots showed hypoplastic necrotic lesions along their stems. The lesions appeared directly attributable to the nitrophenolic treatment and were seriously retarding the growth processes of the plants.

Example 4

A commercially available herbicide composition containing 2,4-dinitro-6-secondarybutyl-phenol as an active toxicant, was dispersed in water to prepare an aqueous spray composition containing 9 pounds of toxicant per 40 gallons of spray mixture. The commercial herbicide composition was in the form of an emulsifiable liquid and contained 56 parts by weight of 2,4-dinitro-6-secondarybutyl-phenol, 33 parts of toluene and 11 parts of a dispersing and emulsifying agent (disecondarybutyl-phenol-ethylene oxide-propylene oxide condensation product). This aqueous spray composition and calcium hydroxide were employed for the treatment of soil areas of seeded cotton in the manner described in Example 1, except that the calcium hydroxide was applied to the soil surface as a dust and at a dosage of about 50 pounds per acre. Upon examination seven days after the applications, only one of the cotton plants from the soil plots which had been treated with both the dinitrophenolic composition and the calcium hydroxide dust, was found to show any evidence of objectionable injury. In contrast, 47 percent of the plants from the check plots were scarred along their stems with necrotic lesions.

Example 5

Concentrate A and triethanolamine were separately dispersed in water to prepare two spray compositions, one containing 18 pounds of 2,4-dinitro-6-secondarybutyl-phenol (phenol equivalent) and the other 16.6 pounds of triethanolamine per 40 gallons of spray mixture. These compositions were employed as described in Example 1 for the treatment of soil seeded with cotton. The application techniques, dosages and conditions for emergence and subsequent growth were as previously described except that the dinitrophenolic spray composition was applied to the soil surface prior to the application of the triethanolamine composition.

Fourteen days following the applications, the cotton plants were lifted from the soil, their roots cleaned and the plants thereafter examined for evidence of injury from the dinitrophenolic toxicant. No evidence of objectionable injury or stunting was found for the plants from the plots which had been treated with both the nitrophenolic phytotoxicant and the aqueous triethanolamine. In contrast, 74 percent of the plants from the check plots had growth retarding hypoplastic necrotic lesions along their stems.

Example 6

Potassium 2,4-dinitro-6-methylphenolate and triethylamine are separately dispersed in water to prepare two aqueous spray compositions, one containing 10 pounds of 2,4-dinitro-6-methyl-phenol (phenol equivalent) and the other 20 pounds of triethylamine per 40 gallons of spray mixture. These compositions are employed in the manner described in Example 1 and at a dosage of 40 gallons per acre for the treatment of soil seeded with cotton. The application techniques and conditions for growth are as previously described except that the dinitrophenolic composition is applied to the soil surface prior to the application of the triethylamine composition. Upon examination 12 days after the applications, the plants from the soil plots treated with both the dinitrophenolic and triethylamine sprays show no significant injury, while many of the plants from the check plots show growth retarding necrotic lesions.

Example 7

A further operation was carried out in a manner exactly comparable to that described in Example 5 except that sodium hydroxide was substituted for the triethanolamine therein employed.

Fourteen days following the applications, no evidence of dinitrophenolic injury was found upon the plants taken from the soil plots which had been treated with both the dinitrophenolic composition and sodium hydroxide composition. In contrast, 74 percent of the plants from the check plots were seriously affected with growth retarding hypoplastic necrotic lesions.

Example 8

Concentrate A and sodium carbonate ($Na_2CO_3$) were dispersed in water to prepare an aqueous spray composition containing 18 pounds of 2,4-dinitro-6-secondarybutyl-phenol (phenol equivalent) and 36 pounds of sodium carbonate per 40 gallons of spray mixture. This spray composition was applied to the surface of dry sandy loam soil of good nutrient content at a dosage of 40 gallons per acre. The application was carried out with a traveling boom type spray rig at a pressure of 40 pounds per square inch. Just prior to the treatment, the soil had been prepared and seeded to cotton. In a check operation, similarly prepared and seeded soil was treated with an aqueous spray composition prepared from Concentrate A. This composition contained 18 pounds of 2,4-dinitro-6-secondary-phenol (phenol equivalent) per 40 gallons of spray mixture and was applied to the soil as above described at a dosage of 40 gallons per acre. The soil plots from before planting and through the pre- and post-emergent period, were under conditions of prolonged drought with prevailing temperatures from 90° to 95° C.

Eleven days after the treatments, representative cotton plants were lifted from the soil, their roots cleaned and the plants thereafter carefully examined for evidence of injury attributable to the dinitrophenolic phytotoxicant. From the examination it was found that 87 percent of the plants from the soil plots which had been treated with the composition containing both the dinitrophenolic phytotoxicant and the sodium carbonate, were free of significant injury. In contrast, 53 percent of the plants from the check plots were seriously affected with growth retarding hypoplastic necrotic lesions.

*Example 9*

Sodium 2,4-dinitro-6-secondarybutyl-phenolate and calcium hydroxide were separately dispersed in water to prepare two aqueous spray compositions, one containing 9 pounds of 2,4-dinitro-6-secondarybutyl-phenol (phenol equivalent) and the other 16.6 pounds of calcium hydroxide per 40 gallons of spray mixture. These compositions were employed in the manner described in Example 1 for the treatment of soil seeded with cotton. The application techniques, dosages and conditions for growth were as previously described except that the dinitrophenolic composition was applied to the soil surface prior to the application of the calcium hydroxide composition.

Eight days following the application, representative cotton plants were lifted from the soil, their roots cleaned and the plants thereafter carefully examined for evidence of injury attributable to the dinitrophenolic phytotoxicant. From the examination it was found that 91 percent of the plants from the soil plots which had been treated with both the dinitrophenolic composition and the calcium hydroxide composition were in good state of growth and not injured by the treatments. In contrast, 74 percent of the plants from the check plots were seriously affected with necrotic lesions.

*Example 10*

Sodium 2,4-dinitro-6-amylphenolate and monoethanol diisopropanolamine are dispersed in water to produce an aqueous composition containing 18 pounds of 2,4-dinitro-6-amylphenol (phenol equivalent) and 25 pounds of monoethanol diisopropanolamine per 40 gallons of spray mixture. In a further operation sodium 2,4-dinitro-6-amylphenolate is dispersed in water to produce an aqueous composition containing 18 pounds of 2,4-dinitro-6-amylphenol (phenol equivalent) per 40 gallons of mixture. These spray mixtures are employed as described in Example 8 for the treatment of soil seeded with cotton. The application techniques, dosages and conditions for germination and subsequent growth are as previously described. Upon examination 10 days after the applications, plants from the plots treated with the combination of nitrophenolic and alkanolamine show little evidence of injury attributable to the treatment. In contrast, many of the plants from the check plots show injury in the form of stunting and stem scarring.

Although the present invention has been illustrated with regard to cotton, similar favorable results are obtained with other "large seeded crop plants." In the latter expression the term "seed" is employed in its broad agricultural meaning and is inclusive of any propagative portion of a plant including true seeds and seed like fruits such as tubers and bulbs. Thus the term "large seeded crops" refers to crops such as cotton, peanuts, beans, corn, peas, potatoes, and gladiolus, in all of which the seed is over one-eighth inch in diameter.

The term alkali is employed in the present specification and claims as defined in Webster's New International Dictionary, Second Edition, Unabridged, published in 1937 by G. and C. Merriam Company, Springfield, Massachusetts, and is inclusive of all materials having marked basic properties. Thus, the term is inclusive of such basic materials as ammonium hydroxide, potassium hydroxide, calcium hydroxide, sodium hydroxide, potassium carbonate, sodium carbonate, alkylamines and alkanolamines.

We claim:

1. A method which comprises applying to the soil surface of an area previously planted with a large seeded crop (a) an aqueous dispersion of a phytotoxicant selected from the group consisting of the 2,4-dinitro-6-loweralkyl-phenols and their water-soluble salts at a substantially uniform dosage of from 1 to 18 pounds of 2,4-dinitro-6-loweralkyl-phenol per acre and (b) an alkali at a substantially uniform dosage per acre of at least the weight of 2,4-dinitro-6-loweralkyl-phenol applied to said soil, said applications being completed at least 48 hours prior to the normal time for emergence of said crop plants.

2. A method which comprises applying to the soil surface of an area previously planted with a large seeded crop (a) an aqueous dispersion of a phytotoxicant selected from the group consisting of 2,4-dinitro-6-secondarybutyl-phenol and its water-soluble salts at a substantially uniform dosage per acre of from 1 to 18 pounds of 2,4-dinitro-6-secondarybutyl-phenol per acre and (b) an alkali at a substantially uniform dosage per acre of at least the weight of 2,4-dinitro-6-secondarybutyl-phenol applied to said soil, said applications being completed at least 48 hours prior to the normal time for emergence of said crop plants.

References Cited in the file of this patent

UNITED STATES PATENTS 2,392,859     Meuli _____ Jan. 15, 1946

FOREIGN PATENTS 425,295     Great Britain _____ Feb. 28, 1935

OTHER REFERENCES

Research Report, Ninth Annual North Central Weed Control Conference, 1952, Winnipeg, Canada, December 9, 10, 11, page 44.